: 3,535,859
HEADER CONSTRUCTION FOR COMBINES
AND THE LIKE
William M. Adams, Stockton, Calif., assignor to International Harvester Company, Chicago, Ill., a corporation of New Jersey
Filed July 21, 1965, Ser. No. 473,652
Int. Cl. A01d 41/02
U.S. Cl. 56—21                                            1 Claim

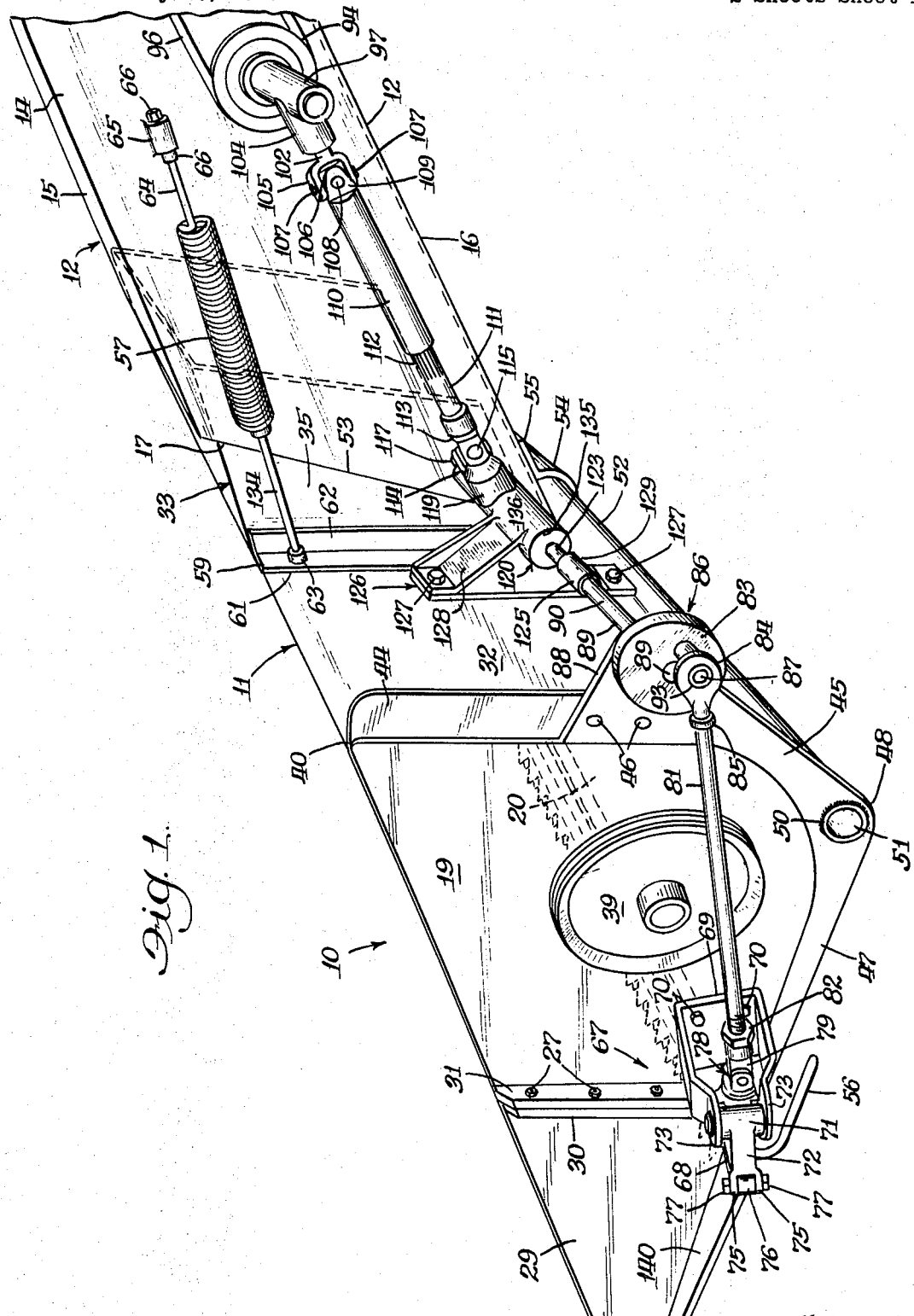

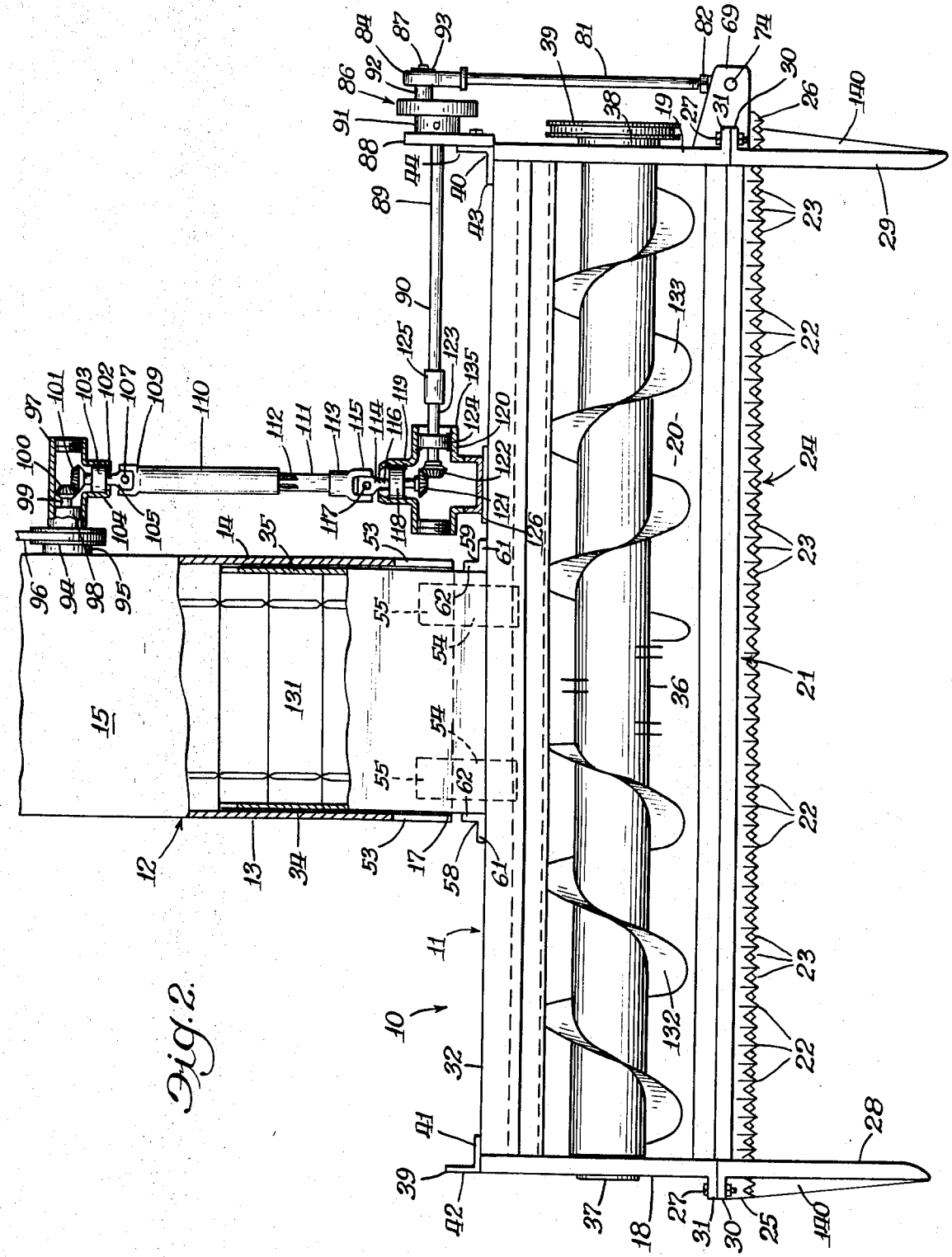

ABSTRACT OF THE DISCLOSURE

A header for a combine harvester having a feeder and a platform. The platform carries a sickle along its leading edge and is pivotally connected to the feeder about a transverse axis located rearwardly and on a substantially horizontal level with the sickle. Sensing means are carried by the platform at a fixed distance below the sickle to detect variations in ground topography and cause responsive pivoting of the platform with respect to the feeder.

The instant invention relates to combines. Particularly the invention relates to adjustable header constructions for harvesting devices such as combines.

A harvesting device of the class contemplated by the instant invention may comprises a self-powered body to which there is connected a header which comprises a pair of connected structures referred to as a feeder and a platform. The platform may support on the forward end portion thereof a reel which is adapted to direct crop in the harvesting path toward a crop cutting mechanism. The crop cutting mechanism is mounted on the forward end portion of the platform below and rearwardly of the reel and is disposed transversely of such crop cutting path. A usual cutting mechanism comprises a stationary cutter bar and a sickle which is reciprocative against stationary blades of the cutter bar to thereby cut crop being harvested. The severed crop is deposited on the flat table-like surface of the platform where it is engaged by a cross-conveyor such as a conventional platform auger. The platform auger is disposed transversely of the platform behind the cutting mechanism and serves to direct the cut crop centrally of the grain table and rearwardly thereof to the feeder. The feeder is disposed behind the platform and medially thereof, and comprises a conveyor disposed within a housing the forward end of which is disposed in crop receiving alignment with the platform auger and the rearward end of which extends upwardly from the platform and rearwardly to the body of the combine toward processing apparatus into which the feeder conveys the harvested crop.

The header conventionally is disposed in a generally angular disposition from its lead or platform end which is adjacent the ground to the rearward or upper end which is disposed substantially above the ground and connected to the body of the combine. A conventional harvesting device of the class described is equipped with spacing means the function of which is to maintain the cutting mechanism at a preferred height above the ground regardless of the changing toppography thereof to procure desired crop yields. To such end, conventionally, the entire header may be rockable or floatable about an axis provided by a connector with which the header is pivoted to the combine. Pivoting or floating of the header is in response to topographic changes detected by a sensor which may be a shoe carried on a forward end portion of the platform adjacent the cutting mechanism. Through its rigid connection, the sensor causes the entire header to rock about the aforesaid pivot in response to the topographical changes.

In a conventional combine, the difference in elevation between the pivot about which the header floats and the cutting mechanism is quite substantial, the cutting mechanism being adjacent the ground as aforesaid, whereas the pivot for the header may be several feet above the ground level. Accordingly, the arcuate segment of the path through which the cutting mechanism will be carried as it rocks downwardly is curved inwardly toward the tractor in a manner such that the cutting mechanism will roll. Therefore, there is a danger that the cutting mechanism will be angularly driven into the soil should there be an unusal ground level drop about the platform.

To the end that it is desirable to minimize potential hazard to a cutting mechanism resulting from digging which would occur as a consequence of extreme angular movement of the cutting edges as a header rocks downwardly, it is desirable to provide means to minimize change of cutting mechanism attitude during harvesting from a selected posture. That can be done by providing means for rocking the header about an axis which is substantially at the same elevation as that of the cutting mechanism. As a consequence of such relative disposition of the cutting mechanism and the axis about which it floats, the major component of the direction of the path of adjustment of the header during harvesting will be vertical. Thereby, the normally horizontal or desired attitude of the cutting mechanism will be maintained reasonably well, said cutting mechanism moving generally vertically in such desired or horizontal attitude in response to changes in ground topography.

To make available a grain combine having an axis of rocking for a cutting mechanism which axis is at an elevation closer to the elevation of the cutting mechanism than that which is procurable in conventional combines, and pursuant to a principal object of the instant invention, means are provided for rocking a platform independently of its associated feeder.

It is another object of the instant invention to provide, for a combine and the like, a header having a platform which floats about an axis of rotation adjacent the platform and at a level about the lower end portion of its associated feeder.

An additional object of the instant invention is to provide a combine having a platform construction which is rockably mounted about the lead end of an associated feeder, whereby the grain cutting mechanism is rockable responsively to changes in ground contour without moving the entire header construction.

It is a further object of the instant invention to provide in a combine of the class described a header construction having a platform which is telescopically connected to the forward end of the combine feeder and having means for rocking the platform relative to the forward end of the feeder to adjust the elevation of a platform-carried cutting mechanism and maintain the same in substantially horizontal attitude at predetermined spacing from the ground.

A yet further object of the instant invention is the provision of drive means for reciprocation of the sickle of a cutting mechanism in a combine of the class described having a drive train comprising a plurality of components which are secured along the header and which have telescopic parts to accommodate both extension and rocking of the platform with respect to the feeder.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a side perspective of one embodiment of the instant invention.

FIG. 2 is a plan view of the instant invention having portions broken away for clarity.

Referring now more particularly to the drawings, there is shown partially a construction conventionally referred to as a header generally designated by the numeral 10. The header comprises a platform generally designated by numeral 11 and a feeder generally designated by numeral 12. The header 10 is adapted for mounting on a harvesting apparatus, such as a combine (not shown), of the character generally employed in the harvesting of grain. The platform 11 is disposed adjacent the ground with its longitudinal axis extending in a manner such that it would be disposed transversely of a normal path during harvesting. The feeder 12 is elongated and extends upwardly and rearwardly from said platform 11 to the body of a combine (not shown), said feeder being disposed in a manner such that its longitudinal axis is aligned with a normal path during harvesting.

As illustrated in the drawings, the feeder 12 comprises a housing, casing or box characterized by a pair of elongated side walls 13 and 14 which are parallel to each other and to the path during harvesting, an integral roof or top wall 15, and an integral floor 16 parallel to roof 15. The feeder 12 comprises a conveyor 131 which receives harvested crop at the platform 11 and delivers it to a mechanism, such as a concave (not shown), housed within the body of the combine for processing in a conventional manner, well known to those in the art. The forward or lead end of the box comprising feeder 12 defines an opening 17 which may be rectangular and which is disposed in receiving alignment with the platform.

The platform 11 comprises a pair of widely spaced apart substantially vertical wedge-shaped side walls or plates 18 and 19 which are parallel to each other and disposed in a manner such that they will be spaced transversely of a path during harvesting. A grain table, floor or deck 20, which extends transversely of the plates 18 and 19 and having opposite side portions which are connected to the side walls 18 and 19, forms a base over which the cut grain will be directed and on which the cut grain will be confined within the platform 11 by walls 18 and 19. The forward or lead end of the deck 20 has rigidly secured thereto in any conventional manner a stationary cutter bar 21 of what may be a conventional cutting mechanism. The cutting mechanism comprises guards 22, only some of which have been numbered in the drawings, which are triangular and have conventional sharp edges forming stationary cutters. The movable cutters 23, only some of which have been numbered, of a sickle generally designated as 24 are reciprocated transversely of the side walls 18 and 19 for cutting grain or the like in a conventional manner against the stationary cutters.

The cutter bar 21 extends forwardly from the deck 20, and, in the described embodiment, projects beyond the forward edges of the walls 18 and 19 to which there are connected a pair of substantially vertically disposed triangular dividers or plates 28 and 29, respectively. The dividers are mounted in the general planes of the side walls 18 and 19, and function in a conventional manner including provision of support frame means transversely of which there may be mounted a reel (not shown) which is adapted to feed crop toward its associated cutter bar 21 as it moves in a harvesting path. As illustrated in the drawings, each of the dividers 28 and 29 has a vertical rear flange 30 which is connected to an associated vertical lead flange 31 of a respective of side walls 18 and 19 by fasteners 27 such as bolts or the like.

In the form of the invention illustrated, the sickle 24 is only partially shown. However, in a conventional manner, the cutter bar 21 forms a base or framework in which the sickle 24 is reciprocated transversely of the side walls 18 and 19. To the end that all of the grain entering the combine between dividers 28 and 29 will be severed, provision must be made for an adequate swath of the sickle. Therefore, the cutter bar 21 extends outwardly beyond dividers 28 and 29 as indicated at 25 and 26 in FIG. 2. Engagement of grain by the end portions 25 and 26 of cutter bar 21 is prevented by ground shields 140. Shields 140 extend laterally from and may be integral with the dividers 28 and 29, respectively, as illustrated, said shields functioning to ride over grain and block engagement thereof with said extensions 25 and 26.

The platform 11 is defined by a rear wall 32 having a pair of opposite ends rigidly connected to the side walls 18 and 19. Rear wall 32 extends vertically upwardly from the deck 20 with the rear end of which said rear wall may be integral. The rear wall 32 has an orifice, opening or port which is in delivery alignment with the opening 17 of the box comprising feeder 12. A telescoping connector or gusset 33, which may comprise a pair of parallel side plates 34 and 35, is projected rearwardly from the rear wall 32, said plates 34 and 35 having inner ends disposed about the delivery opening in wall 32 and defining a delivery grain chute. The walls 34 and 35 may be spaced from each other to conform with the arrangement of the walls 13 and 14 against the inner surfaces of which the walls 34 and 35 are slidably mounted for telescopic association of the connector 33 with the feeder 12 into the front end of which said connector 33 adjustably extends, as illustrated in the drawings.

Thereby, grain cut by the sickle 24 will be carried over the deck 20 and delivered through the rear wall 32, through the connector 33 and thence into the feeder 12. To collect cut crop which has been deposited on deck 20 and carry it medially thereof, and deliver it to the connector 33 onto conveyor 131, a conventional screw conveyor or platform auger 36 having oppositely turned threads 132 and 133 is employed, as illustrated in FIG. 2. Said auger 36 is disposed in operative relationship with deck 20, said auger extending transversely of the platform 11 and having a shaft the opposite end portions of which are projected through the side walls 18 and 19 and suitably journalled in side wall supported bearings 37 and 38 respectively. A sheave 39 is supported in driving relationship on the shaft of auger 36 adjacent bearing 38 for connection to the prime mover of the combine in connection with which the present invention is employed.

The platform 11 comprises an external framework which is defined by a pair of right angular frame members 39 and 40 which are mounted in spaced apart relationship longitudinally of the platform 11. The frame member 39 has a connecting angular flange 41 which is rigidly secured, in any suitable manner, to the rear wall 32 at its juncture with the side wall 18. The frame member 39 is also characterized by an outwardly extending flange 42 which may extend normally to the connecting flange 41, said flange 42 being disposed in the plane of the platform side wall 18. The frame member 39 has an unseen portion or boss which extends beneath the platform corresponding to a like part in the frame member 40, the definition of which ensues.

The frame member 40 has a connecting flange 43 which is rigidly secured to the rear wall 32 of the platform in any suitable manner adjacent the junction of the rear wall 32 and the platform side wall 19. The frame member 40 has a normal flange 44 which extends rearwardly from the flange 43 and is disposed in the plane of the platform side wall 19. The frame member 40 is characterized by a lower section, extension or support member 45 which corresponds to a like part (not shown) of the frame member 39. The upper part of support member 45 is rigidly secured by means of fasteners such as rivets 46 or the like to the flange 44, said support member 45 having a lower forwardly extending arm 47 which is secured to the lower end portion of the side wall 19 by any suitable means. The foregoing construction generates a boss 48 which projects outwardly from the corner formed at the junction of deck 20, the side wall 19 and the platform rear wall 32. A like boss (not shown) is provided in opposed aligned position on the opposite side of the platform adjacent the juncture formed by the deck 20, the rear wall 32 and the side wall 18. The boss 48 and its counterpart on the opposite side of the platform each provides a support in which a respective end portion 51 of a transversely extending shaft 52 is retained by means including a retainer 50, as illustrated in FIG. 1.

The box defining feeder 12 is constructed in a manner such that the forward edges 53 of walls 13 and 14 project forwardly as they extend downwardly from the feeder housing roof 15 in such a manner that disposes floor 16 adjacent the platform rear wall 32 at the junction thereof with deck 20 and spaces the roof 15 rearwardly from said rear wall, as clearly illustrated in FIG. 1. Thereby, rocking movement of platform 11 inwardly and outwardly relative to the feeder 12 about a pivot disposed adjacent the rear of deck 20 is accommodated. Rocking of platform 11 is achieved by reason of the shaft 52 which extends longitudinally of the platform and has a medial portion journalled in a pair of transversely spaced brackets 54. A flange 55 of each bracket 54 is rigidly secured to the under surface of floor 16. Accordingly, the platform 11 is pivotable relative to the feeder 12, the connector 33 moving inwardly of the feeder and outwardly therefrom through the opening 17 in which said connector is telescopically disposed.

Rocking of the platform about the axis provided by the shaft 52 will be in response to changes in topography of the ground adjacent the cutter bar 21 which carries a sensor or shoe 56. The sensor is rigidly secured to the cutter bar and is disposed therebelow, said sensor serving as a spacer to keep the cutting mechanism at a fixed distance from the ground during harvesting. Sensor 56 detects changes in ground topography as it moves during harvesting, and changes in pressure on sensor 56 caused by changes in the topography will be transmitted through the cutter bar 21 to the platform which will rock about the axis provided by the shaft 52 relative to the forward opening 17 of the feeder 12. The sensor 56 may be in the form of a plurality of fingers spaced across the width of the platform.

Orderly management of the movement of the platform may be controlled by spring means which in this embodiment includes a compression spring 57 which bears against platform 11 to maintain sensor 56 in ground engagement. As illustrated in the drawings, the connector 33 is secured about the opening in the wall 32 by means which may include a pair of parallel angle bars 58 and 59. Angle bars 58 and 59 extend generally vertically along the platform rear wall 32 adjacent the opening therein, each of said angle bars 58 and 59 having a flange 61 rigidly secured to the wall 32, and a right angular rearwardly extending flange 62 rigidly secured to a respective of the side walls 34 and 35 of said connector 33 for rigid connection thereof to the platform 11.

The compression spring 57 is part of spring means which includes a forward rod 134 having a rear end portion connected to the forward end portion of the spring 57, said rod 134 having a forward end portion rigidly secured by means of a suitable connector 63 to the flange 61 of angle bar 59. A rear rod or spring extension 64 has its forward end portion connected to the rear end portion of the spring 57, said rod or spring extension 64 having its rear end portion projected through a relatively stationary bracket 65 and adjustably secured against said bracket by retaining means comprising releasable retainer members 66. As illustrated in FIG. 1, the retainer members 66 may be opposed nuts suitably mounted on the end portion of the rod or spring extension 64 to engage opposite sides of the bracket 65 and hold the rod 64 from movement independently of the bracket 65. The bracket 65 may be suitably secured on the feeder side wall 14.

A standard sickle drive generally desingated by the numeral 67 is operably connected to a lateral or input end extension 68 of sickle 24 for reciprocation thereof transversely of the platform side walls 18 and 19. To the end that the connection of sickle 24 to the standard drive 67 is achieved, a bracket 69 is rigidly secured by means of fasteners 70 or the like to the platform side wall 19. The hub end portion 71 of a sickle crank 72 is journalled between a pair of opposed arms 73 of said bracket 69 about a substantially vertical pivot pin 74 which provides the axis of rotation for said sickle crank. The outer end portion of the sickle crank 72 is bifurcated or provides a pair of substantially vertically spaced extensions or yoke 75 in which the hub end portion 76 of a link connected to the sickle extension 68 is pivoted on a threaded pin secured by fasteners such as opposed lock nuts 77.

A conventional transverse rocking linkage or swivel joint generally designated 78, including a yoke-type bracket 79, is operably connected to the hub 71 to rock the same from side to side to reciprocate the sickle 24 in its normal reciprocative path. The outer end portion 80 of the bracket 79 provides a threaded well into which the forward end portion of an elongated force transmission crank link, arm or rod 81 is adjustably threaded with securance being by means of a nut 82. The rod or link 81 extends rearwardly adjacent the side wall 19 from its connection to the bracket 79 to the rear end portion of the platform 11. The rear end portion of the rod 81 comprises or is connected to a bearing connector 84 by means which may include an internally threaded collar 85 mounted on adjacent end portions and adjustably connecting together the rod 81 and connector 84.

The rod 81 is reciprocated by means of a crank generally designated 86. The crank 86 comprises a driven disc 83 which carries an eccentric pin 87 which is journalled in a bearing 93 carried by connector 84. Accordingly, therefore, as the disc 83 rotates, the rod 81 will be reciprocated forwardly and rearwardly, causing the swivel joint 78 to rock about the axis provided by the pin 74 to reciprocate the sickle 24.

To rotate the disc 86, the frame member 45 is provided with a rearwardly extending boss 88 which is disposed at an elevation about midway between the top and bottom of the rear platform wall 32. The work or output end portion 89 of a shaft 90, which is disposed to be transverse of the normal path during harvesting, is projected through the boss 88, said end portion 89 being journalled in a bearing block 91 which serves as a spacer, as illustrated in FIG. 2. One surface of the bearing block 91 abuts the outside face of the boss 88, and the other abuts the inside of the disc 83 which is secured concentrically on said end portion 89, thereby to rotate said disc.

The disc 83 is retained from lateral movement away from the bearing block 91 by means of a tubular spacer or bearing member 92 through which the eccentric pin 87 is projected, one end of said spacer 92 abutting the outside face of the disc 83 and the other end of said spacer 92 abutting the connector 84. A retainer which may comprise a radial flange of bearing 93 holds the connector 84 from lateral displaceemnt and against the outer face of the spacer 92.

The power train to the shaft 90 comprises a sheave 94 which is mounted adjacent feeder wall 14, said sheave being suitably secured on a stub shaft 99 journalled in a bearing block 95 which is carried on wall 14 and therefrom serves to space the sheave 94. Sheave 94 is driven by a pulley belt 96 operably connected to the power source of the combine in connection with which the instant invention is employed. Lateral displacement of the sheave 94 is by reason of its abutment with a 90° gear box 97 through a bearing 98 of which stub shaft 99 is projected, as illustrated in FIG. 2.

The stub shaft 99 has rigidly secured on the outer end thereof a bevel gear 100 which operably meshes with a bevel gear 101 disposed at right angles to the bevel gear 100. Bevel gear 101 is rigidly secured on a shaft 102 which is projected at right angles from shaft 99 through a gear case bearing 103 outwardly from a normal extension 104 of the gear case 97.

On its outer end portion, the shaft 102 is integral with or carries the bifurcated joint member or yoke 105 of a universal-type joint. A force transmission cylinder 106, which is seen in FIG. 1, is disposed transversely of the pair of arms of the yoke 105, being rotatable about an axis provided by pin means 107 which serve to retain cylinder 106 in the yoke 105. Pin means 108 are projected through the cylinder 106 transversely of the longitudinal axis thereof. Said pin means 108 have aligned outer end portions on which the opposed or spaced apart arms of a bifurcated joint member or yoke 109 are mounted on opposite sides of the cylinder 106, said pin means 108 providing an axis of rotation for said yoke 109.

Accordingly, as the shaft 102 rotates, the yoke 105 rotates with said shaft 102 about the axis provided thereby. Simultaneously, yoke 109 will be driven about the axis provided by shaft 102 as a result of torque transmission through cylinder 106. Additionally, however, while said yoke 109 is thusly driven, it is free to rock about the axes provided by pin means 107 and pin means 108.

The joint member or yoke 109 is integral with or carried on the rear end portion of an elongated tube 110 which extends longitudinally of the feeder 12 toward the platform 11. The tube 110 has telescopically mounted therein a rod 111 having a plurality of elongated circumferentially extending keys 112 by which said rod 111 is splined to the tube 110, whereby said rod 111 may slide longitudinally of the tube, inwardly and outwardly, from the forward end opening thereof, but is restrained from rotation independently thereof.

A bifurcated joint member or yoke 113 is rigidly secured on the forward end portion of the rod 111. The yoke 113, together with a yoke or bifurcated member 114, comprises a universal type joint for the forward end portion of the rod 111. To that end, pin means 115 which are mounted transversely of the arms of the yoke 113 provide therefor an axis of rotation. The pin means 115 extend transversely through a cylinder (not seen) on the opposite sides of which the arms of the yoke 113 are disposed. The longitudinal axis of the unseen cylinder extends normally to the pin means 115 and is mounted between the arms of yoke 114, said unseen cylinder being journalled about an axis provided by pin means 117. Accordingly, while the yoke 113 is rotatable about the axis of rotation of the yoke 114, said yoke 113 is rockable about the axes provided by pin means 115 and pin means 117.

The yoke 114 is carried on or integral with the outer end portion of a stub shaft 116 which is projected inwardly through a bearing 118 mounted in the rearward extension 119 of gear case 120. At its inner end, stub shaft 116 has mounted thereon a bevel gear 121 which operably meshes with a bevel gear 122 which is angularly disposed from the bevel gear 121. The bevel gear 122 is disposed within the lateral extension 135 of gear case 120, and said gear 122 is secured on the inner end portion of a shaft section 123 which is journalled in a bearing 124 mounted within the gear case extension 135. The outer end portion of the shaft section 123 is co-axially aligned with the shaft 90 to the end portion of which the shaft section 123 is operably coupled in driving relationship by means of a connector sleeve 125.

A mounting plate or boss 126 is carried on the rear surface of the platform rear wall 32, said plate 126 being secured to wall 32 by means of fasteners such as bolts 127 or the like, as illustrated in FIG. 1. A bracket or mounting means 136 comprising a pair of oppositely upwardly and downwardly and forwardly extending arms 128 and 129 provides a rigid support for the gear case extension 135 in alignment with the boss 88 transversely of the platform 11. The upper and lower end portions of said arms 128 and 129, respectively, are secured to the boss or mounting plate 126 by means of the fasteners 127.

From the foregoing it is apparent that a floating platform is provided for a harvesting device which is pivoted at or about the rear end of the deck 20 relative to the feeder 12. It is appreciated that the telescopic connector 33 provides an enclosure for continuous passage of harvested crop between the platform 11 and the feeder 12, regardless of the relative disposition of the platform and the feeder.

Furthermore, the shaft 52 provides an axis of rotation about which the platform floats, the elevation of which approximates that of the cutter bar 21 and the sickle 24. Accordingly, as the platform rocks responsive to changes in ground topography indicated by the sensor 56, the attitude of the cutter bar 21 and sickle 24 will not change appreciably. That is to say, the change of attitude thereof during rocking will not be of a magnitude sufficient to result in digging.

In addition, the invention provides means for use with a conventional mechanical sickle drive for accommodating pivoting of the platform 11 independently of the feeder 12. The same is achieved by means of a sickle drive mechanism comprising tube 110 and telescoping rod 111, whereby the effective length of the sickle drive train is altered to accommodate the change in the distance between gear box 97 and gear box 120, and also by the provision for bending of the sickle drive train comprising bendable means defined by co-acting joint members 105 and 109 connected to gear box 97 and co-acting joint members 113 and 114 connected to gear box 120. By reason of such bendable means, the sickle drive will be transmitted from sheave 94 through the gears in box 97 to the tube 110 which is disposed normally to sheave-driven stub shaft 99. The tube 110 will be driven about its longitudinal axis regardless of the position to which it has been rocked about either pin means 108 or the cylinder 106. Similarly, the rod 111, to which the drive torque has been transmitted through tube 110, will transmit its torque to the shaft 90 through the gears in the gear case 120 regardless of the position of the platform, the gear case 120 being rockable about the normal axes provided by the pin means 115 and 117.

As many substitutions or changes could be made in the above described construction, and as many apparently widely different embodiments of the invention within the scope of the claim could be constructed without departing from the scope and spirit thereof, it is intended that all matter contained in the accompanying specification shall be interpreted as being illustrative and not in a limiting sense.

What is claimed is:

1. For use with a combine and the like, a header construction comprising a feeder housing having a longitudinal axis extending angularly downwardly longitudinally of a path of the combine during harvesting and having an upper rear end portion connected in crop transmission association with said combine and a lower forward grain receiving end portion defining a rearwardly and upwardly sloping open front end, said feeder housing comprising a pair of parallel side walls and an integral floor having a forward end from which the front end of said feeder housing extends upwardly; an elongated platform having a longitudinal axis extending transversely of the open front end of said feeder housing and defining a rear wall having therein a crop delivery opening; a pair of parallel plates secured to said rear wall about said crop delivery opening and telescopically disposed in the open front end of said feeder housing, said floor forward end disposed adjacent said rear wall in crop receiving alignment with said crop delivery opening; a rock shaft extending longitudinally of said platform and connected thereto, said shaft providing a rocking axis for said platform; a bracket carried beneath the floor of said feeder housing, said shaft mounted in said bracket, said platform rockable relative to said feeder box; a cutting bar supported in grain cutting position on said platform and extending transversely of a path of said combine during harvesting; an elongated sickle mounted for reciprocation slidably along said cutter bar longitudinally thereof; a sensor member secured to and having a portion disposed adjacent and at a fixed distance from said platform to detect variations in ground topography and cause responsive adjustment in the elevation of said cutter bar by rocking said platform; compression spring means providing a floating mounting for and urging said platform to rock about said shaft, and means for reciprocating said sickle at varying platform positions.

References Cited

UNITED STATES PATENTS

| | | | |
|---|---|---|---|
| 1,598,234 | 8/1926 | Baldwin | 56—21 |
| 2,644,284 | 7/1953 | Oberholtz et al. | 56—21 |
| 2,750,727 | 6/1956 | Wright | 56—208 |
| 3,293,835 | 12/1966 | Gehman et al. | 56—23 |
| 3,306,014 | 2/1967 | Halls et al. | 56—23 |

ANTONIO F. GUIDA, Primary Examiner